United States Patent
Ohlrich et al.

(10) Patent No.: US 10,148,503 B1
(45) Date of Patent: Dec. 4, 2018

(54) MECHANISM FOR DYNAMIC DELIVERY OF NETWORK CONFIGURATION STATES TO PROTOCOL HEADS

(71) Applicant: EMC Corporation, Hopkinton, MA (US)

(72) Inventors: Miles Ohlrich, Seattle, WA (US); Siva Muhunthan, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 429 days.

(21) Appl. No.: 14/982,007

(22) Filed: Dec. 29, 2015

(51) Int. Cl.
G06F 15/177 (2006.01)
H04L 12/24 (2006.01)
H04L 29/08 (2006.01)

(52) U.S. Cl.
CPC ........ H04L 41/0816 (2013.01); H04L 41/085 (2013.01); H04L 67/10 (2013.01); H04L 67/2842 (2013.01)

(58) Field of Classification Search
CPC ............. H04L 41/0816; H04L 67/2842; H04L 41/0853; H04L 41/08
See application file for complete search history.

(56) References Cited

U.S. PATENT DOCUMENTS

| | | | |
|---|---|---|---|
| 6,324,577 B1 * | 11/2001 | Hirai | H04L 41/00 370/254 |
| 6,856,591 B1 * | 2/2005 | Ma | H04L 41/0631 370/216 |
| 7,506,360 B1 * | 3/2009 | Wilkinson | H04L 61/10 726/3 |
| 8,751,533 B1 * | 6/2014 | Dhavale | G06F 3/0647 707/782 |
| 9,467,416 B2 * | 10/2016 | Chan | H04L 67/26 |
| 9,529,772 B1 * | 12/2016 | Shankaran | H04L 67/1097 |
| 9,647,891 B2 * | 5/2017 | Croy | H04L 41/0893 |
| 9,706,582 B2 * | 7/2017 | Kim | H04W 76/02 |
| 9,736,254 B1 * | 8/2017 | Soundararajan | H04L 51/32 |
| 2003/0140132 A1 * | 7/2003 | Champagne | H04L 41/082 709/223 |
| 2007/0168693 A1 * | 7/2007 | Pittman | G06F 11/2005 714/4.11 |
| 2008/0065764 A1 * | 3/2008 | Huang | H04L 67/125 709/224 |

(Continued)

Primary Examiner — Shean Tokuta
(74) Attorney, Agent, or Firm — Krishnendu Gupta

(57) ABSTRACT

Implementations for communicating network configuration and IP changes to protocol heads. An in-memory cache of currently available IP addresses and locations can be maintained via a registration and callback method. The registered protocol head will have its cache updated when the network configuration changes. The protocol head will also receive events indicating specific changes as they occur, and a callback can be registered to act upon certain configuration events. An additional event can be sent to the protocol head indicating intent to move IP addresses from one node to another. The provided information allows the protocol head to make quicker, more informed decisions about IP address states when interacting with its protocol clients. It also allows the protocol head to anticipate IP movement so that it can provide improved availability and fewer disruptions for its protocol clients, improving the continuous availability experience.

9 Claims, 5 Drawing Sheets

(56) References Cited

U.S. PATENT DOCUMENTS

| | | | |
|---|---|---|---|
| 2009/0154374 A1* | 6/2009 | Jaatinen | H04L 41/085 370/254 |
| 2009/0259736 A1* | 10/2009 | Chang | G06F 9/505 709/221 |
| 2009/0307522 A1* | 12/2009 | Olson | G06F 11/2007 714/4.1 |
| 2010/0061257 A1* | 3/2010 | Kitawaki | H04L 12/2602 370/252 |
| 2011/0249558 A1* | 10/2011 | Raaf | H04W 24/02 370/237 |
| 2012/0036240 A1* | 2/2012 | Lancaster | H04L 41/0803 709/221 |
| 2012/0054537 A1* | 3/2012 | Tornqvist | H04L 41/0663 714/4.12 |
| 2012/0066678 A1* | 3/2012 | Pafumi | G06F 9/45558 718/1 |
| 2012/0215918 A1* | 8/2012 | Vasters | H04L 67/02 709/226 |
| 2012/0218917 A1* | 8/2012 | Komarevtsen | H04L 41/0843 370/254 |
| 2012/0254396 A1* | 10/2012 | Prahalad | H04L 12/1895 709/224 |
| 2013/0090056 A1* | 4/2013 | Panpaliya | H04L 12/189 455/15 |
| 2013/0262500 A1* | 10/2013 | Bratspiess | H04L 43/103 707/769 |
| 2013/0346519 A1* | 12/2013 | Soundararajan | G06Q 10/06 709/206 |
| 2014/0071223 A1* | 3/2014 | Chatterjee | H04L 65/403 348/14.08 |
| 2014/0085650 A1* | 3/2014 | Redfield | G06K 15/02 358/1.13 |
| 2014/0259147 A1* | 9/2014 | L'Heureux | H04L 63/02 726/14 |
| 2015/0016439 A1* | 1/2015 | Zhou | H04L 61/255 370/338 |
| 2015/0142932 A1* | 5/2015 | Hallivuori | H04L 41/0803 709/220 |
| 2015/0146570 A1* | 5/2015 | Kaivosoja | H04L 41/0806 370/254 |
| 2015/0227318 A1* | 8/2015 | Banka | G06F 3/0617 709/202 |
| 2015/0229521 A1* | 8/2015 | Mayer | H04L 67/1097 709/222 |
| 2016/0105768 A1* | 4/2016 | Pinard | H04W 4/21 455/457 |
| 2016/0165650 A1* | 6/2016 | Kim | H04W 12/06 370/329 |
| 2016/0226732 A1* | 8/2016 | Kim | H04L 12/2807 |
| 2016/0227454 A1* | 8/2016 | Toskala | H04W 36/0033 |
| 2016/0380807 A1* | 12/2016 | Shevenell | H04L 41/082 370/252 |
| 2017/0063630 A1* | 3/2017 | Olmsted-Thompson | H04L 41/12 |
| 2017/0063676 A1* | 3/2017 | Olmsted-Thompson | H04L 45/02 |
| 2017/0150421 A1* | 5/2017 | Kuge | H04W 76/23 |
| 2017/0257339 A1* | 9/2017 | Wilkinson | H04L 61/10 |

* cited by examiner

MECHANISM FOR DYNAMIC DELIVERY OF NETWORK CONFIGURATION STATES TO PROTOCOL HEADS

FIELD OF THE INVENTION

This invention relates generally to distributed file systems, and more particularly to implementations for dynamically communicating network configuration and internet protocol address changes to protocol heads.

BACKGROUND OF THE INVENTION

Distributed file systems offer many compelling advantages in establishing high performance computing environments. One example is the ability to easily expand, even at large scale. Another example is the ability to support multiple unique network protocols. In one example, a distributed file system can operate under a cluster of nodes topology, whereby clients can connect to any node among the cluster of nodes to perform file system activity. Individual nodes among the cluster of nodes each can contain their own processor(s), storage drives, memory and the like. Operating together in a cluster, the nodes can respond to client requests, store data, mirror data, and accomplish all the tasks of a modern file system. In communicating with clients, a distributed file system of nodes can support multiple protocol interactions. For example, some clients may want to communicate using NFS protocols, while other clients may desire SMB protocol exchanges to store/retrieve data, while still other clients may use HDFS. To support multiple clients using multiple protocols, protocol heads can be established on each node that act as a gateway for all clients using the protocol on that node to interact with the file system.

When accessing the file system, and connecting to individual nodes among a cluster of nodes, the distributed file system may seek to move or redirect clients from one node to another. For example, to achieve load balancing, a client on an overburdened node may be moved to a node that has spare capacity. In another example, a node can suffer node failure, whereby the node is no longer responsive to client requests. In this example, a client may be redirected to a different node that is still functioning and capable of fulfilling client requests. To effectuate the moving of clients of varying protocols from one node to a second node, a master list of network configuration can be maintained. The network configuration data can associate specific internet protocol ("IP") addresses with a node and/or a protocol head of the node. By consulting the networking configuration data, processes can be aware of the current availability of various IP addresses as well as the current assignment of various IP addresses to allow for intelligent movement of clients between nodes.

Network configuration data can be stored in a centralized file of the distributed file system that all protocol heads in nodes in the cluster of nodes can access; however, this can create a bottleneck. For example, individual protocol heads may have the need for fast access to the network configuration data that may not be stored locally on the node where the protocol head resides. In another example, an individual protocol head may need to know when the network configuration data changes, which can create expensive overhead by each protocol head of each node polling the file for change events. In another example, different protocol heads may have different cadence for how they ingest network configuration data.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a protocol head among a set of protocol heads can initiate a networking configuration monitoring agent. The network configuration monitoring agent can receive a current network configuration state. The current network configuration state can be stored in an in-memory cache associated with the protocol head within the node.

In another aspect, the network configuration monitoring agent can register for a set of event notifications associated with a network configuration file for the cluster of nodes. In response to receiving an event notification indicating that the network configuration file has been changed, the current network configuration state in the in-memory cache for a protocol head can be updated to reflect the change(s). In one implementation, the event notification can indicate a will move event will occur. In response to receiving a will move event notification indicating that an internet protocol address will move from a first node among the cluster of nodes to a second node among the cluster of nodes, the protocol head can be notified of the will move event notification. In response to being notified of the will move event notification, the protocol head can take at least one will move action prior to the internet protocol address moving from the first node to the second node.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
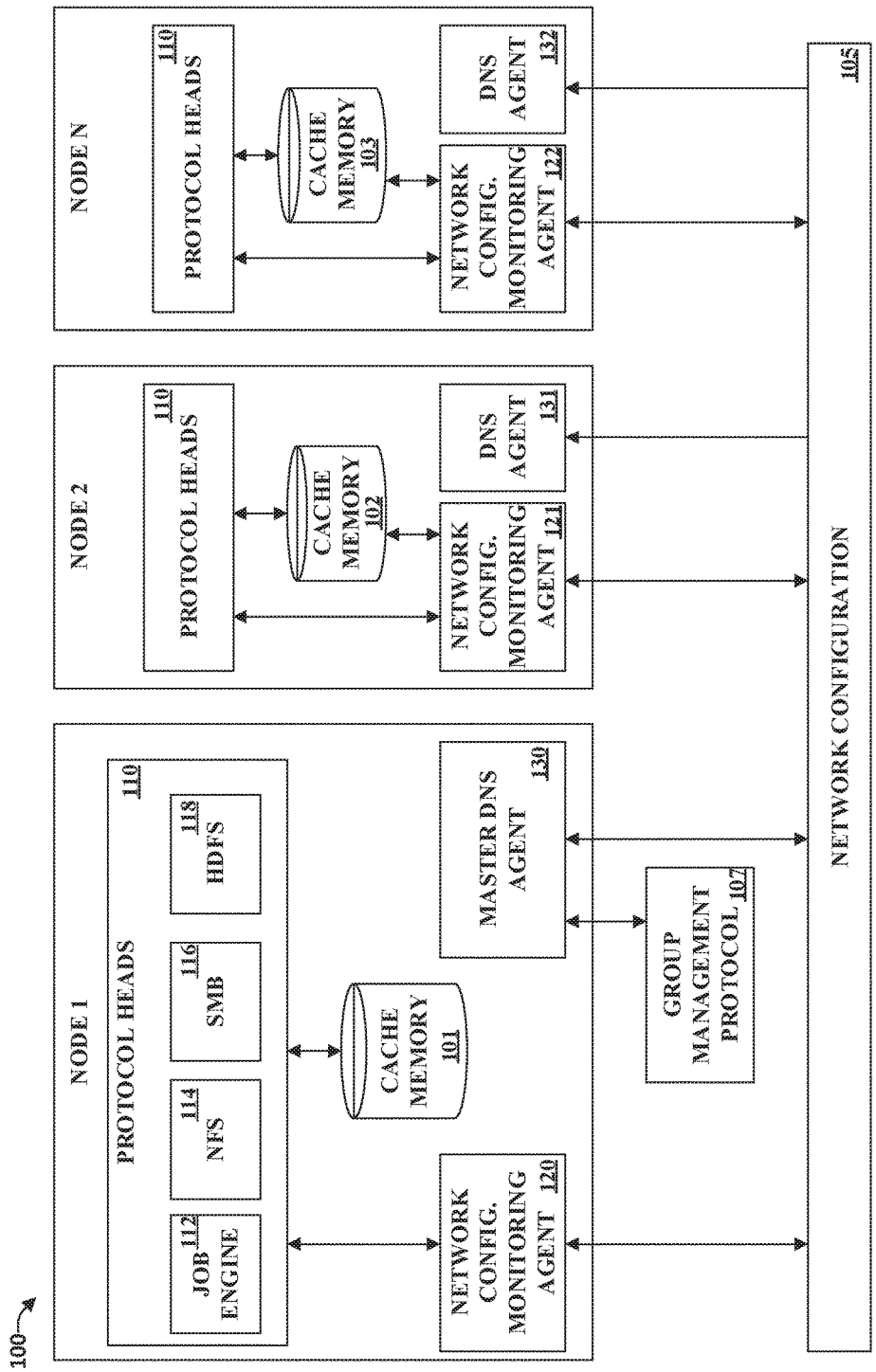
FIG. 1 illustrates an example cluster of nodes utilizing a network configuration monitoring agent in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "protocol head" refers to a gateway local to an individual node that manages communications with external clients and sometime internal clients using a specific network protocol. For example, a Network File System ("NFS") external client that makes a file system request to the distributed file system would communicate with the NFS protocol head in making the request. The protocol head can schedule work items, translate file system requests from the native protocol language to operating system commands of the native file system in order to process the request, and communicate with the external clients using protocol specific cadence that the protocol client expects. Examples of the types of protocol heads that can exist within a distributed file system include NFS, Server Message Block ("SMB"), Hadoop Distributed File System ("HDFS"), hypertext transfer protocol ("HTTP"), file transfer protocol ("FTP"), simple object access protocol ("SOAP"), representational state transfer ("REST"), and protocols specific to the Open Stack project such as Open Stack Swift, Open Stack Manila, etc. In addition to network protocols, the job engine as defined below can act similar to a protocol head in scheduling and performing internal file system jobs.

The term "job engine" refers to a component within the distributed file system that manages automated processes such as file system maintenance, file system data services, and non-client initiated work items. The job engine can queue work items similar to how a protocol head queues work items received by protocol clients.

Implementations are provided herein for communicating network configuration and IP changes to protocol heads. An in-memory cache of currently available IP addresses and locations can be maintained via a registration and callback method. The registered protocol head will have its cache updated when network configuration changes. The protocol head will also receive events indicating specific changes as they occur, and a callback can be registered to act upon certain configuration events. An additional event can be sent to the protocol head indicating intent to move IP addresses from one node to another. The provided information allows the protocol head to make quicker, more informed decisions about IP address state when interacting with its protocol clients. It also allows the protocol head to anticipate IP movement so that it can provide improved availability and fewer disruptions for its protocol clients, improving the continuous availability experience.

Implementations are provided herein for providing an abstraction layer between protocol heads that consume Internet protocol ("IP") information and the underlying network configuration and node state of a cluster of nodes. A network configuration monitoring agent can provide dynamically updated network configuration data to protocol heads without the protocol head having to know how and where the network configuration data is stored and without having to directly poll the network configuration file for updates. For example, without the abstraction layer, protocol heads would each individually have to poll a common network configuration file containing network configuration data for the entire cluster of nodes in order to consume the data it stores. By creating an abstraction layer, protocol heads require less intelligence regarding where the network configuration data is stored and how and when it's updated. Instead, the protocol head, upon initiating the network configuration agent, can turn to an in-memory cache area where network configuration is stored and dynamically updated by the network configuration data to retrieve network configuration data. In addition, the network configuration agent can provide event notifications indicating future changes to network configuration data that the protocol heads can act upon prior the network configuration data actually changing.

In one implementation, the network configuration monitoring agent can be implemented as an application program interface ("API") that the protocol head can use to subscribe to events the protocol head has interest in, as well as to establish a common internal protocol that the protocol heads can use to communicate network configuration data. In one implementation, the internal protocol is sent over an individual node's UNIX domain socket.

Referring now to FIG. 1, there is illustrated an example cluster of nodes utilizing a network configuration monitoring agent in accordance with implementations of this disclosure. Node 1, Node 2 and Node N (Where N is an integer greater than 2 is depicted). It can be appreciated that a cluster of nodes can contain many more nodes than the nodes depicted on FIG. 1, and the illustrated example depicts three nodes for ease of explanation.

Network configuration 105 can be a file that is stored within the distributed file system that is comprised of the cluster of nodes. The file can be stored and updated locally in one of the nodes among the cluster of nodes and can be accessed by any other node of the distributed file system (e.g., the cluster of nodes). The network configuration data can also be mirrored across other nodes for data protection or other file system purposes.

A master domain name system ("DNS") Agent is operable to assign IP addresses and IP address pools to both nodes and to individual protocol heads within nodes. For example, in the event a node fails or a node leaves the cluster of nodes for any reason, a group management protocol 107 may instruct the master DNS agent to reassign the IP's that were previously assigned to the now failed or now leaving node to a different node that is still operable within the cluster of nodes. In another example, a node may be overburdened with too many IP clients limiting its ability to efficiently process all the requests the IP clients are making, and a process may instruct the master DNS agent 130 to move IP's from the overburdened node to a less burdened node. The singular master DNS agent can then write network configuration changes to the network configuration 105. Other DNS agents (e.g., 131 & 132), can read from the network configuration 105 to effectuate the changes written into network configuration 105 by master DNS agent 130.

Without a network configuration agent 120, each individual protocol head (e.g., job engine 112, NFS 114, SMB 116, and HDFS 118) for each node (e.g., Node 1, Node 2, and Node N) would have to individually poll the network configuration 105 each time it needed to know the current state of the network configuration in order to process work requests specific to that protocol head. When the network configuration 105 is stored as a file within a single node, polling the file would create network traffic between nodes (e.g., if the protocol head polling the network configuration 105 resided on a different node than the file data).

Network configuration agent 120 can be initiated by any individual protocol head to poll, dynamically monitor, and respond to events associated with network configuration 105. Once initialized, network configuration monitoring agent 120 can poll network configuration 105 for the current state of the network configuration data, and store the current state in node local cache memory (e.g., cache memory 101, 102, 103, etc.). For example, each individual protocol head within a node can be apportioned a region of cache memory space for its use in carrying out protocol head activities. For example, the cache memory portion of the protocol head can be used to pre-load data for protocol head clients to read from or write into. Within this apportioned protocol head cache memory space, the network configuration monitoring agent 120 can write the current network configuration data 105. Whenever the protocol head thereafter needs to know the current network configuration data, it need only poll its own area of cache memory, thereby reducing inter node communication within the cluster of nodes, as well as provide the data faster, as accessing cache memory can be done more quickly than accessing a file in stable storage or accessing file data residing in another node.

Network configuration monitoring agent 120 can also set listening events related to network configuration 105. For example, network configuration monitoring agent 120 can set an event to listen for any change to the network configuration 105. If a change is made to network configuration 105, then the network configuration agent 120 is notified by an event process, it can then read from the network configuration 105 and provide the updated data to the entire set of protocol heads within its local node that have initiated the network configuration agent 120 to track changes to network configuration 105. For example, where job engine 112, NFS 114, SMB 116, and HDFS 118 have all initiated network configuration monitoring agent 120 within node 1 to listen for network configuration changes, upon a change of network configuration data that triggers an event, network configuration monitoring agent 120 can update the cache memory 101 for each individual protocol head portion of the cache memory with the changed network configuration data. In this instance, the event notification system only has to notify the network configuration monitoring agent of the event (e.g., the change in network configuration data) rather than having to notify separate event registrations to each individual protocol head in the node. It can be appreciated that this implementation can reduce network communication traffic. Additionally, each individual protocol head can take its own actions based on configuration change events. For example, a node acting as an HDFS name node may respond to client requests by assigning the client to a datanode through the assigning of a currently available IP address to the client. In another example, the SMB protocol head can notify SMB clients through the SMB3 Witness protocol that their connection is lost, and allow them to quickly move to a new node. In another example, the NFS protocol head implementing the Network Lock Manager (NLM) may send clients notification messages indicating that a cluster node has crashed.

In addition to changes to network configuration 105, network configuration monitoring agent 120 can also listen for events related to planned future changes of network configuration 105. For example, master DNS agent 130 may have intelligence learned from the group management protocol 107 (e.g., a new node will be joining and/or leaving, a node is unavailable due to upgrade, etc.) or other file system processes (e.g., an overburdened node will need to transfer IP addresses to other nodes) and it, can prior to updating the network configuration 105, instruct either the network configuration 105 or the network configuration monitoring agent 120 of its plan to move an IP address or pool of IP addresses. This planned move can be deemed a "will move" event. The will move event can then be identified by the network configuration monitoring agent and any protocol head in its node that requested to be notified of will move events can be informed of the expected IP change. In the amount of time prior to the network configuration being updated with the actual move event, the protocol heads can take actions to prepare for the IP move. In one example, a protocol head that is giving out IP's to protocol clients may wish to avoid giving the client an IP address that is about to move nodes to a client as the protocol client connecting to a first node and then having to migrate to a second node (as predicted by the will move event notification) may generate a tangible delay in processing the protocol client's work items. Each individual protocol head can take its own actions based on will move events that are supported by their protocols. For example, a node acting as an HDFS name node may respond to client requests by assigning the client to a datanode through the assigning of a currently available IP address to the client, where the IP address is not about to move to another node. In another example, an NFS protocol head may temporarily stop responding to new NFS requests on an IP that is about to be moved, in order that its response does not get lost.

Figure 2:
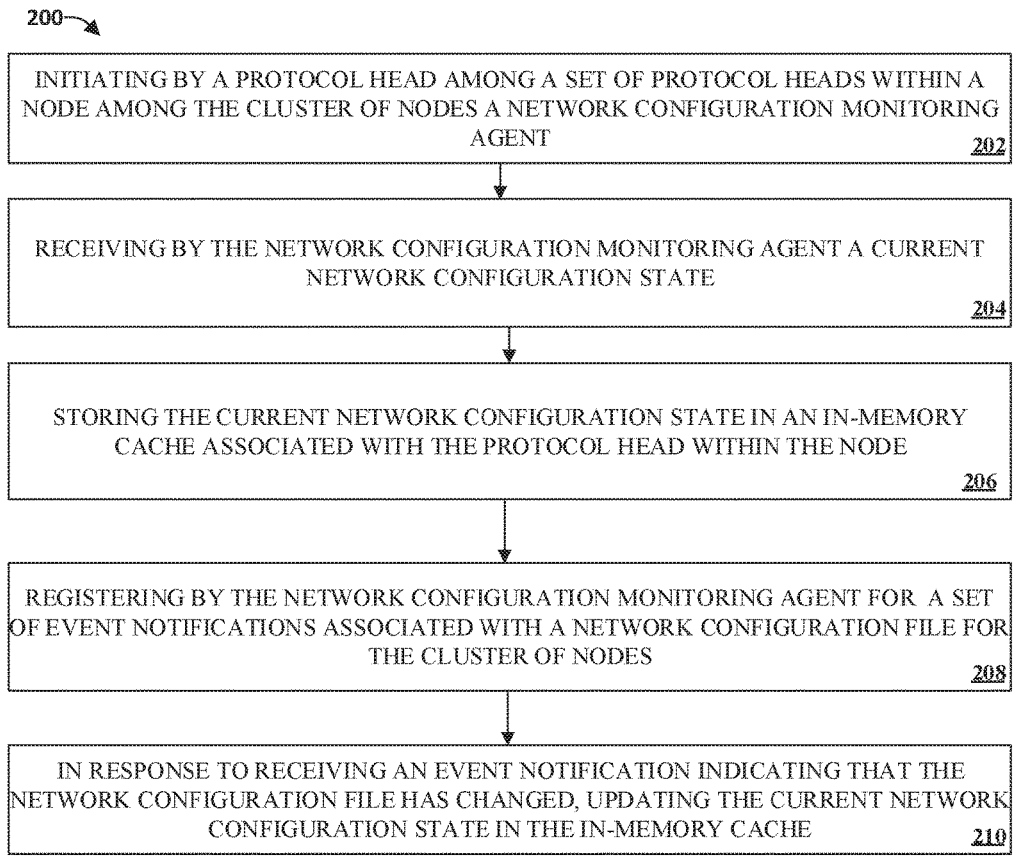
FIG. 2 illustrates an example method for using a network configuration monitoring agent to store and dynamically update network configuration state data in an-memory cache associated with an individual protocol head in accordance with implementations of this disclosure.
Figure 3:
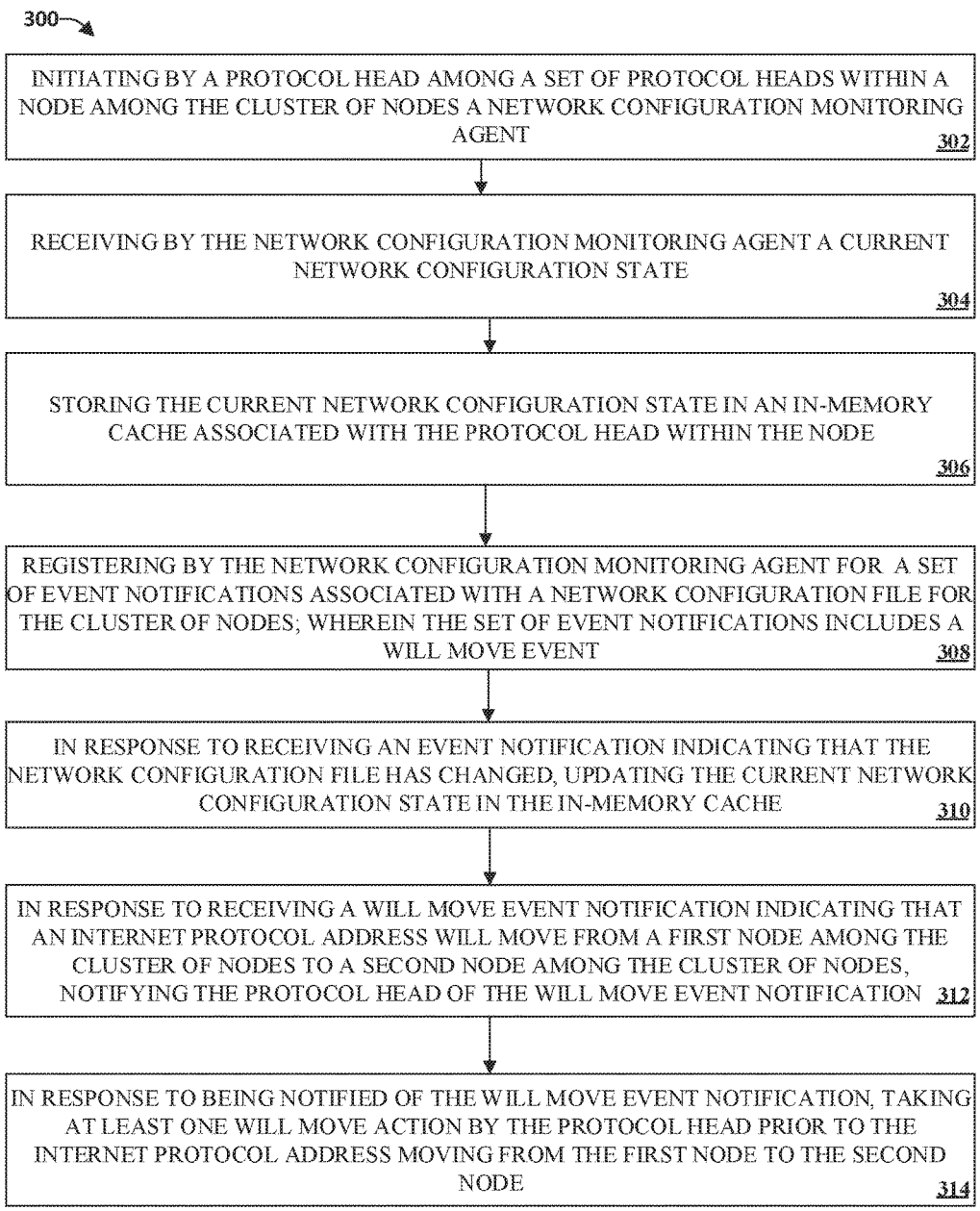
FIG. 3 illustrates an example method for using a network configuration monitoring agent to store and dynamically update network configuration state data in an-memory cache associated with an individual protocol head including responding to will move events in accordance with implementations of this disclosure

FIGS. 2-3 illustrate methods and/or flow diagrams in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 2 illustrates an example method for using a network configuration monitoring agent to store and dynamically update network configuration state data in an-memory cache associated with an individual protocol head in accordance with implementations of this disclosure.

At 202, a protocol head among a set of protocol heads within a node among a cluster of nodes can initiate a network configuration monitoring agent. In one implementation, the set of protocol heads can include at least one of NFS, SMB, HDFS, HTTP, FTP, SOAP, REST, and protocols specific to the Open Stack project such as Open Stack Swift, Open Stack Manila.

At 204, the network configuration agent can receive a current network configuration state. In one implementation, the network configuration state includes a list of internet protocol addresses wherein internet protocol addresses within the list of internet protocol addresses are associated with a node among the cluster of nodes and a protocol head among the set of protocol heads.

At 206, the current network configuration state can be stored in an in-memory cache associated with the protocol head within the node. For example, an in-memory cache can have portions of the cache uniquely assigned for exclusive use by individual protocol heads; such that the protocol head manages the data that is stored within that portion of the in-memory cache. It can be appreciated that the allocation of the portions of the in-memory cache that are managed by each protocol head can be dynamically adjusted by various file system processes.

At 208, the network configuration agent can register a set of event notification associated with the network configuration file for the cluster of nodes.

At 210, in response to receiving an event notification indicating that the network configuration file has changed, the current network configuration state in the in-memory cache as described in step 206 can be updated to reflect the changes.

FIG. 3 illustrates an example method for using a network configuration monitoring agent to store and dynamically update network configuration state data in an-memory cache associated with an individual protocol head including responding to will move events in accordance with implementations of this disclosure At 302, a protocol head among a set of protocol heads within a node among a cluster of nodes can initiate a network configuration monitoring agent.

At 304, the network configuration agent can receive a current network configuration state.

At 306, the current network configuration state can be stored in an in-memory cache associated with the protocol head within the node.

At 308, the network configuration agent can register a set of event notification associated with the network configuration file for the cluster of nodes.

At 310, in response to receiving an event notification indicating that the network configuration file has changed, the current network configuration state in the in-memory cache as described in step 306 can be updated to reflect the changes.

At 312, in response to receiving a will move event notification indicating that an internet protocol address will move from a first node among the cluster of nodes to a second node among the cluster of nodes, the protocol head can be notified of the will move event notification. It can be appreciation that the protocol head is notified prior the IP address actually moving, such that the protocol head can take actions prior to actual move event that the will move event is indicating will take place.

At 314, in response to being notified of the will move event notification, taking at least one will move action by the protocol head prior to the internet protocol address moving from the first node to the second node.

Figure 4:
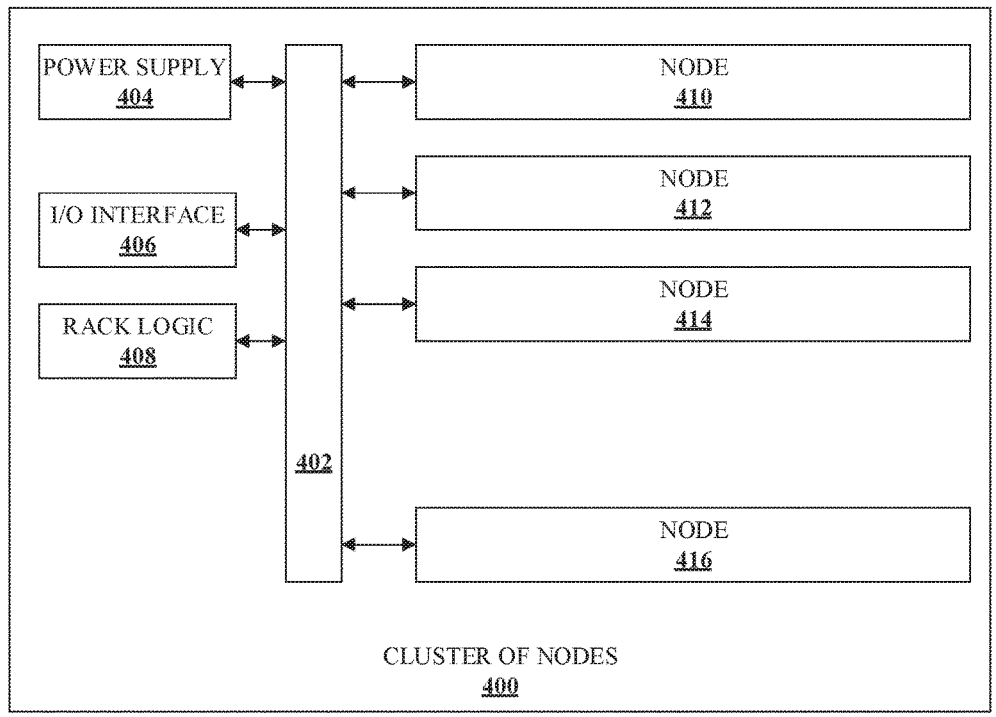
FIG. 4 illustrates an example block diagram of rack of a cluster of nodes in accordance with implementations of this disclosure.

FIG. 4 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 410, 412, 414 and 416 operating in a cluster; however, it can be appreciated that more or less nodes can make up a cluster. It can be further appreciated that nodes among the cluster of nodes do not have to be in a same enclosure as shown for ease of explanation in FIG. 4, and can be geographically disparate. Backplane 402 can be any type of commercially available networking infrastructure that allows nodes among the cluster of nodes to communicate amongst each other in as close to real time as the networking infrastructure allows. It can be appreciated that the backplane 402 can also have a separate power supply, logic, I/O, etc. as necessary to support communication amongst nodes of the cluster of nodes.

As shown in the figure, enclosure 400 contains at least a power supply 404, an input/output interface 406, rack logic 408, several blade servers 410, 412, 414, and 416, and backplane 402. Power supply 404 provides power to each component and blade server within the enclosure. The input/output interface 406 provides internal and external communication for components and blade servers within the enclosure. Backplane 408 can enable passive and active communication of power, logic, input signals, and output signals for each blade server.

It can be appreciated that the Cluster of nodes 400 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 46 disk drive bays with attached disk storage in each bay. It can be appreciated that nodes within the cluster of nodes can have varying configurations and need not be uniform.

Figure 5:
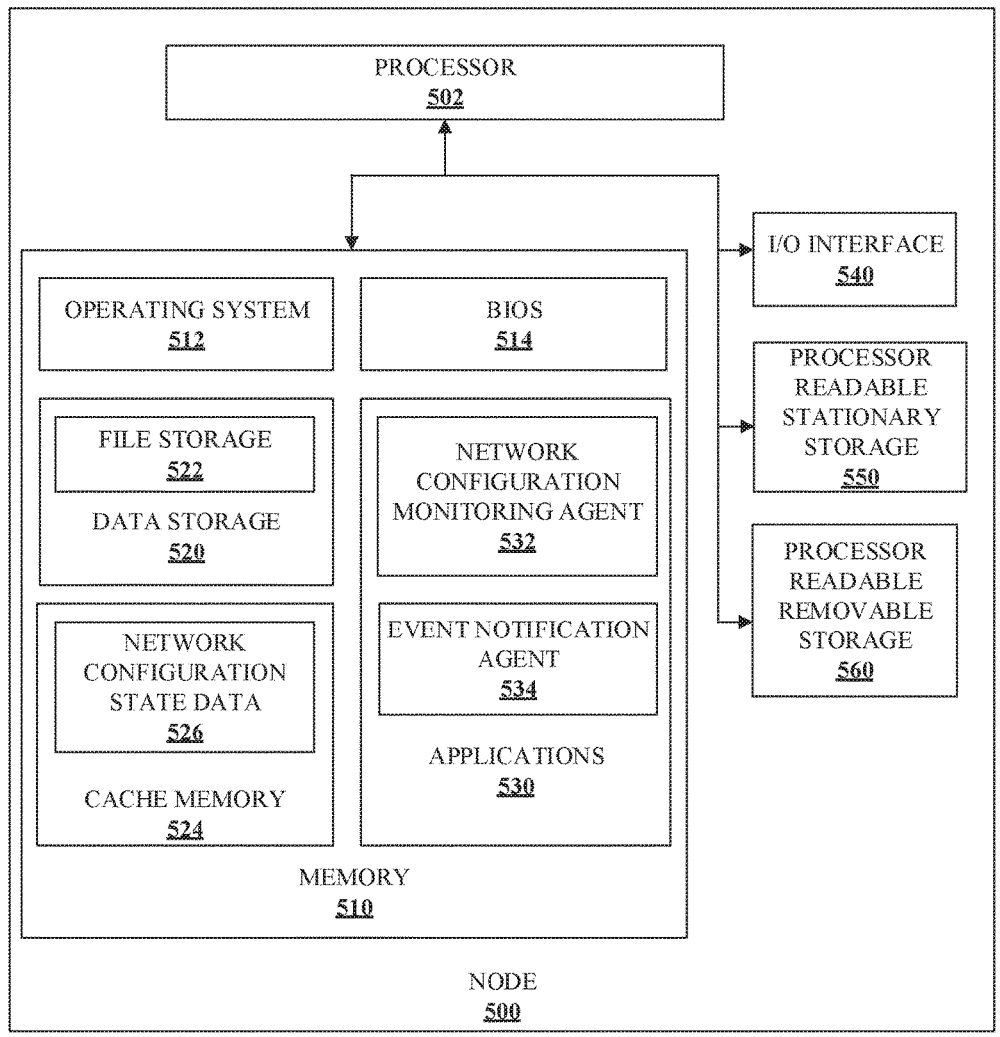
FIG. 5 illustrates an example block diagram of a node in accordance with implementations of this disclosure.

FIG. 5 illustrates an example block diagram of a blade server 500 in accordance with implementations of this disclosure. As shown in FIG. 5, a plurality of blade servers may be included in one enclosure that shares resources provided by the enclosure to reduce size, power, and cost.

Node 500 includes processor 502 which communicates with memory 510 via a bus. Node 500 also includes input/output interface 540, processor-readable stationary storage device(s) 550, and processor-readable removable storage device(s) 560. Input/output interface 540 can enable node 500 to communicate with other nodes, mobile devices, network devices, and the like. Processor-readable stationary storage device 550 may include one or more devices such as an electromagnetic storage device (hard disk), solid state hard disk (SSD), hybrid of both an SSD and a hard disk, and the like. In some configurations, a node may include many storage devices. Also, processor-readable removable storage device 560 enables processor 502 to read non-transitive storage media for storing and accessing processor-readable instructions, modules, data structures, and other forms of data. The non-transitive storage media may include Flash drives, tape media, floppy media, disc media, and the like.

Memory 510 may include Random Access Memory (RAM), Read-Only Memory (ROM), hybrid of RAM and ROM, and the like. As shown, memory 510 includes operating system 512 and basic input/output system (BIOS) 514 for enabling the operation of blade server 500. In various embodiments, a general-purpose operating system may be employed such as a version of UNIX, LINUX™, a specialized server operating system such as Microsoft's Windows Server™ and Apple Computer's OS X, or the like.

Applications 530 may include processor executable instructions which, when executed by node 500, transmit, receive, and/or otherwise process messages, audio, video, and enable communication with other networked computing devices. Examples of application programs include database servers, file servers, calendars, transcoders, and so forth. Applications 530 may include, for example, network configuration monitoring agent 532 and event notification agent 534 according to implementations of this disclosure. It can be appreciated that a UI for such application can exists, such as within a web UI for the distributed file system as a whole.

Human interface components (not pictured), may be remotely associated with blade server 500, which can enable remote input to and/or output from blade server 500. For example, information to a display or from a keyboard can be routed through the input/output interface 540 to appropriate peripheral human interface components that are remotely located. Examples of peripheral human interface components include, but are not limited to, an audio interface, a display, keypad, pointing device, touch interface, and the like.

Data storage 520 may reside within memory 510 as well, storing file storage 522 data such as metadata or LIN data. It can be appreciated that LIN data and/or metadata can relate to file storage within processor readable stationary storage 550 and/or processor readable removable storage 560. For example, LIN data may be cached in cache memory 524 for faster or more efficient frequent access versus being stored within processor readable stationary storage 550. In addition, Data storage 520 can also host zone data and token data in accordance with implementations of this disclosure. Cache memory 524 can also store network configuration state data 526 as described above in implementations of this disclosure. For example, cache memory 524 can have portions of its total capacity allocated to individual protocol heads for management of what is stored in the allocated area, including storing, overwriting, and reading the data within the area of cache memory 524 the protocol heads manage, including the network configuration state data 526.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method for communicating network configuration changes to protocol heads within a cluster of nodes comprising:
    initiating by a protocol head among a set of protocol heads within a node among the cluster of nodes a network configuration monitoring agent;
    receiving by the network configuration monitoring agent a current network configuration state;
    storing the current network configuration state in an in-memory cache associated with the protocol head within the node;
    registering by the network configuration monitoring agent for a set of event notifications associated with a network configuration file for the cluster of nodes, wherein the set of event notifications includes a will move event;
    in response to receiving a will move event notification indicating that an internet protocol ("IP") address will move from a first node among the cluster of nodes to a second node among the cluster of nodes, notifying the protocol head of the will move event notification; and
    in response to being notified of the will move event notification, at least one of modifying a set of IP addresses given to new client requests by the protocol head and delaying responses to new client requests associated with the IP address by the protocol head, prior to the IP address moving from the first node to the second node.

2. The method of claim 1, wherein the network configuration state includes a list of internet protocol addresses wherein internet protocol addresses within the list of internet protocol addresses are associated with a node among the cluster of nodes and a protocol head among the set of protocol heads.

3. The method of claim 1, further comprising:
    in response to receiving an event notification indicating that the network configuration file has changed, updating the current network configuration state in the in-memory cache.

4. A non-transitory computer readable medium with program instructions stored thereon to perform the following acts:
    initiating by a protocol head among a set of protocol heads within a node among the cluster of nodes a network configuration monitoring agent;
    receiving by the network configuration monitoring agent a current network configuration state;
    storing the current network configuration state in an in-memory cache associated with the protocol head within the node;
    registering by the network configuration monitoring agent for a set of event notifications associated with a network configuration file for the cluster of nodes, wherein the set of event notifications includes a will move event;
    in response to receiving a will move event notification indicating that an internet protocol ("IP") address will move from a first node among the cluster of nodes to a second node among the cluster of nodes, notifying the protocol head of the will move event notification; and
    in response to being notified of the will move event notification, at least one of modifying a set of IP addresses given to new client requests by the protocol head and delaying responses to new client requests associated with the IP address by the protocol head, prior to the IP address moving from the first node to the second node.

5. The non-transitory computer readable medium of claim 4, wherein the network configuration state includes a list of internet protocol addresses wherein internet protocol addresses within the list of internet protocol addresses are associated with a node among the cluster of nodes and a protocol head among the set of protocol heads.

6. The non-transitory computer readable medium of claim 4, with program instructions stored thereon to further perform the following acts:
    in response to receiving an event notification indicating that the network configuration file has changed, updating the current network configuration state in the in-memory cache.

7. A system comprising at least one storage device and at least one hardware processor configured to:
    initiate by a protocol head among a set of protocol heads within a node among the cluster of nodes a network configuration monitoring agent;
    receive by the network configuration monitoring agent a current network configuration state;
    store the current network configuration state in an in-memory cache associated with the protocol head within the node;
    register by the network configuration monitoring agent for a set of event notifications associated with a network configuration file for the cluster of nodes, wherein the set of event notifications includes a will move event;
    in response to receiving a will move event notification indicating that an internet protocol ("IP") address will move from a first node among the cluster of nodes to a second node among the cluster of nodes, notify the protocol head of the will move event notification; and
    in response to being notified of the will move event notification, at least one of modify a set of IP addresses given to new client requests by the protocol head and delay responses to new client requests associated with the IP address by the protocol head, prior to the IP address moving from the first node to the second node.

8. The system of claim 7, wherein the network configuration state includes a list of internet protocol addresses wherein internet protocol addresses within the list of internet protocol addresses are associated with a node among the cluster of nodes and a protocol head among the set of protocol heads.

9. The system of claim 7, further configured to:
    in response to receiving an event notification indicating that the network configuration file has changed, update the current network configuration state in the in-memory cache.

* * * * *